(12) United States Patent
Salser, Jr.

(10) Patent No.: US 9,702,751 B2
(45) Date of Patent: Jul. 11, 2017

(54) DUAL MEASUREMENT TANK WITH NESTED STRUCTURE

(71) Applicant: Floyd Stanley Salser, Jr., Ocala, FL (US)

(72) Inventor: Floyd Stanley Salser, Jr., Ocala, FL (US)

(*) Notice: Subject to any disclaimer, the term of this patent is extended or adjusted under 35 U.S.C. 154(b) by 504 days.

(21) Appl. No.: 14/253,824

(22) Filed: Apr. 15, 2014

(65) Prior Publication Data

US 2014/0318281 A1    Oct. 30, 2014

Related U.S. Application Data

(63) Continuation-in-part of application No. 29/480,517, filed on Jan. 27, 2014, now Pat. No. Des. 755,939.

(60) Provisional application No. 61/811,830, filed on Apr. 15, 2013.

(51) Int. Cl.
*G01F 25/00* (2006.01)
*B60K 15/06* (2006.01)

(52) U.S. Cl.
CPC ......... *G01F 25/0007* (2013.01); *B60K 15/06* (2013.01)

(58) Field of Classification Search
CPC ............ G01F 25/0007; G01F 25/0038; G01F 25/0046; B60K 15/06; B60K 15/00
See application file for complete search history.

(56) References Cited

U.S. PATENT DOCUMENTS

| | | | | |
|---|---|---|---|---|
| 370,336 A | * | 9/1887 | Irons ..................... | B60K 15/06 126/95 |
| 767,302 A | * | 8/1904 | Malone .................... | B67D 1/04 137/170.2 |
| 3,068,683 A | * | 12/1962 | Petterson, Jr. ............ | G01F 1/76 177/207 |
| 3,692,048 A | * | 9/1972 | Uchida ................. | G05D 11/134 137/403 |
| 4,549,432 A | * | 10/1985 | Bland ..................... | G01F 15/08 73/200 |
| 4,852,395 A | * | 8/1989 | Kolpak .............. | G01N 33/2823 73/61.44 |
| 5,337,515 A | * | 8/1994 | Robins .................. | A01G 31/02 47/62 E |
| 5,901,740 A | * | 5/1999 | Sanchelima ........... | A23C 19/05 137/392 |

(Continued)

FOREIGN PATENT DOCUMENTS

JP             61243341 A    * 10/1986

OTHER PUBLICATIONS

Abstract in English of JP 61243341 A.*

*Primary Examiner* — Lisa Caputo
*Assistant Examiner* — Nathaniel T Woodward
(74) *Attorney, Agent, or Firm* — Monty Simmons; Simmons Patents

(57) ABSTRACT

Disclosed is a dual measurement tank comprising a first tank with an open top defining a first tank volume and a second tank defining an open top and defining a second tank volume that is smaller than the first tank volume. The second tank is disposed inside the first tank so that when fluid is pumped into the top of the second tank until such fluid overflows, the fluid overflow flows into the first tank. The dual tank is placed on a scale to measure the weight of the water in the two tanks where such weight is converted to a volume.

18 Claims, 16 Drawing Sheets

(56) References Cited

U.S. PATENT DOCUMENTS

| | | | | |
|---|---|---|---|---|
| 5,935,427 A * | 8/1999 | Witter | ................ | B01D 17/0214 |
| | | | | 137/203 |
| 5,971,009 A * | 10/1999 | Schuetz | ................ | B65D 90/30 |
| | | | | 137/264 |
| 6,064,311 A * | 5/2000 | Ferenczi | ............ | G01M 3/3263 |
| | | | | 340/606 |
| 6,263,902 B1 * | 7/2001 | Booth | ....................... | F17C 1/00 |
| | | | | 137/264 |
| 2009/0120176 A1 * | 5/2009 | Despres | ................ | G01G 17/06 |
| | | | | 73/114.52 |
| 2012/0255352 A1 * | 10/2012 | Sakaguchi | ............... | G05D 9/12 |
| | | | | 73/290 R |

\* cited by examiner

DUAL MEASUREMENT TANK WITH NESTED STRUCTURE

CLAIM TO PRIORITY

This application claims priority to provisional application 61/811,830 filed on Apr. 15, 2013 and is further a continuation in part to design application Ser. No. 29/480,517 filed on Jan. 27, 2014 and the contents of all such references are hereby incorporated by this reference for all that they disclose for all purposes.

TECHNICAL FIELD

The inventions relate to the field of testing flow meters and include improvements to test benches configured for testing the accuracy of flow meters such as water meters.

BACKGROUND

There are many different types of water meters, all using different principles to measure water flow including positive displacement, multi-jet, nutating disc, and the fluidic oscillator, just to name a few. Although they utilize vastly different principles to measure flow, the principle used to test their accuracy is the same: run an absolute known volume of water through a meter or group of meters, and compare their registered volumes to that of the known volume. If the results show an acceptable deviation from the known volume, then the meter is working correctly, if the deviation is unacceptable, it is not.

Further, while meters may be the exact same make and type, the results they produce can be entirely different. Some meters may not be accurate on low flows, others on high flows.

When testing flow meter accuracy, one should remember that the accuracies of the tests are only as good as the accuracy to which the meters are read. The most widely used and probably the most popular method for testing meters is the volumetric system. The volumetric system can be compared to a measuring cup; the tanks are calibrated and volumes are marked at different levels along the side, and the water level is viewed through a sight tube. The corresponding volume is then compared to the volumes recorded by the meters.

The typical small meter test system is the gravimetric test system. The standard prior art gravimetric test system is made up of the following components:

Test Bench: The actual device on which meters are placed, secured, and read;
Control Console: The testing interface which houses the control wiring, computer, and the scale interface hardware;
Scales: The physical hardware on which the measurement tanks sit that measures the weight of the water;
Controller: The measurement system used to measure volume and serve as an operator interface for the computerized and manually controlled tests;
Software: The software used in conjunction with the Controller to control and document the tests as well as provide an inventory database;
Measurement Tanks: Tanks to which water is directed for measuring volumes via the scales;
Control Valves: A system of valves that direct the water throughout the different cycles of testing;
Motion Operator: The device on the test bench, which pushes the valves and spools together, making a water tight transition from meter to meter without using bolt;
Test Spools: Varying lengths and diameters of pipe spools used as spacers and transition pieces between meters;
Carrier Bars: The device on the bench that holds the meters in place, allowing them to slide while the clamping device pushes them together, without the need for bolts;
Roto Meters: Quick reference flow meters allowing the technician to set an approximate flow (to within + or −2%) rate while running a test;
Meter Adaptors: Used for positioning MNPT threaded meters to provide for the transition from one meter size to the next;
Electric Actuator: The part of the motion operator that moves the device One short coming of prior art gravimeter systems is that they require different size tanks for different flow rates with each tank having its own scale. Such test systems may require a 3,300-gallon tank and associated scale, a 100-gallon tank and associated scale, and a 10 gallon tank and associated scale. Such tank systems require lots of room and redundant scale technology. What is needed is a way of reducing the number of different tank and associated scale structures.

Another problem with prior art test systems is that they were designed for metal meters. Consequently, the test system meter interface (e.g. meter fitting), used to associated the meter under test with the test bench, is configured for metal meters. Today, flow meters are increasingly being manufactured from composite materials and plastics. While such test systems can still be used to test composite meters, the prior art meter interface places (and associated clamping forces) significant stresses on a plastic meter and if one is not careful such a meter can be deformed affecting its accuracy during the test. Further, such stresses may cause permanent damage. What is needed is a new meter interface that does not subject the meter under test to unacceptable levels of pressure and stress.

Yet another shortcoming of prior art test system is that they are not well suited to test multiple fire hydrant meters. Yet another shortcoming of prior art test systems is that the meter clamping process is riskier than it need be for larger meters.

Yet another shortcoming of prior art test systems is that they are not setup to test ultra low flow meters.

The disclosed inventions address at least the above described shortcomings.

DISCLOSURE OF THE INVENTION

The general objective of the present invention is to offer an improved test bench system that provides better ergonomics, improved space utilization by combining test tanks, improved safety features by enhancing metering coupling technologies.

The present invention describes an adapter apparatus configured for associating a meter under test with the fluid flow path of a test bench.

Another general object of the invention is an apparatus and method of sealing the connection between the apparatus and a meter under test to provide for a fluid tight seal at lower clamping pressures that do not significantly distort the case of a composite meter under test.

Another general object of the invention is to provide apparatus and method to stabilize larger meters and associated such larger meters to the fluid flow path of a test bench.

Another general object of the invention is to provide for a dual measurement tank that stores the fluid pumped through the meters during a test wherein a second smaller tank is disposed inside a first larger tank to reduce the amount of space and scales need to perform testing.

Additional objectives and embodiments of the present subject matter, not necessarily expressed in this summarized section, may include and incorporate various combinations of aspects of features or parts referenced in the summarized objectives above, and/or features or components as otherwise discussed in this application.

Other objects and advantages of the invention may be obvious from the description of the drawings, or may be learned through practice of the invention.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 3b is a side elevation view of the drawing in FIG. 3a;

Figure 1:
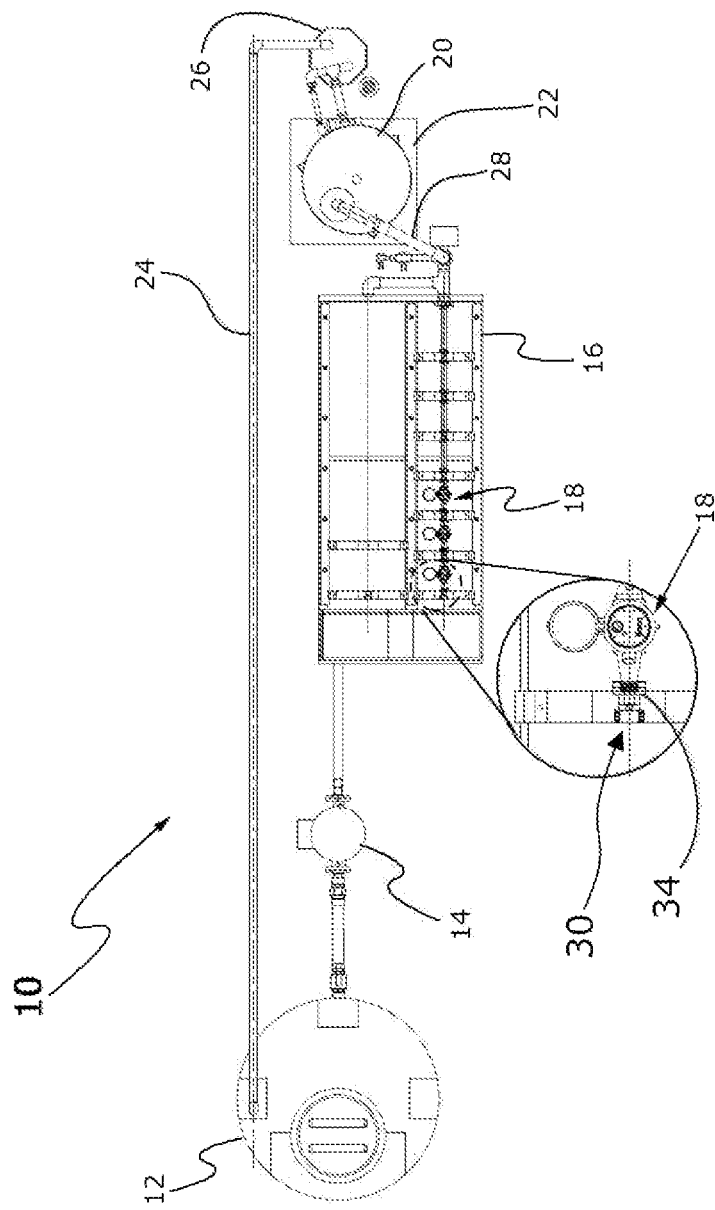
FIG. 1 is a top plan view of a gravimetric test system configured with a plurality of MUT and a dual storage tank.

Repeat use of reference characters throughout the present specification and appended drawings is intended to represent the same or analogous features or elements of the present technology.

BEST MODE FOR CARRYING OUT THE INVENTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Definitions

This section defines some of the terms used in this document while other terms are defined within the description.

For the purposes of this document, two or more physical items are "mechanically associated" (sometimes simply "associated") by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more electrical items are "electrically associated" (sometimes simply "associated") by bringing them together or into relationship with each other in any number of ways including: (a) a direct, indirect or inductive communication connection, and (b) a direct/indirect or inductive power connection. Additionally, while a drawing may illustrate various electronic components of a system connected by a single line, it will be appreciated that such "signal line" may represent one or more signal paths, power connections/paths, electrical connections and/or cables as required by the embodiment of interest.

This document contains headers. Such headers are place markers inserted for the convenience of the reader and are not to be used in the construction of this document or to limit its meaning in any way.

Description

While the examples used in this document relate to systems for testing the accuracy of flow meters measuring the flow/consumption of water, it will be appreciated that such technology can be used to test the accuracy of flow meters measuring other types of fluid.

Fluid meters are configured to measure the volume of a fluid flowing through the meter thereby measuring fluid consumption. Such fluid meters require testing to verify accuracy. Basically, a fluid meter test system pushes a fluid through both a fluid Meter-Under-Test (MUT) and through a very accurate "reference meter". Restated, all the fluid that flows during a test flows through both the MUT (meter under test) and the "reference-meter". The "reference-meter" is configured to generate a very accurate reference-volume reading (which is considered to be the correct reading). Similarly, the meter under test (MUT) measures the volume of fluid that flows though itself and generates a MUT-volume reading. Thus, ideally, the MUT-volume reading would be identical to the reference-volume reading. How much the MUT-volume reading varies from the reference-volume reading is considered the MUT metering error. Ideally, a meter would have the same error at all flow rates. However, in the real world, the meter error is different depending on the flow rate and may measure a 2 gallons/minute flow rate more accurately than 5 gallons/minute flow rate (for example). Thus meters are typically tested at a plurality of flow rates.

Notably, the most accurate way to test water meters is with a gravimetric system. Thus, the "reference meter" described above is actually a gravimetric system that generates the previously described reference-volume reading.

Figure 2:
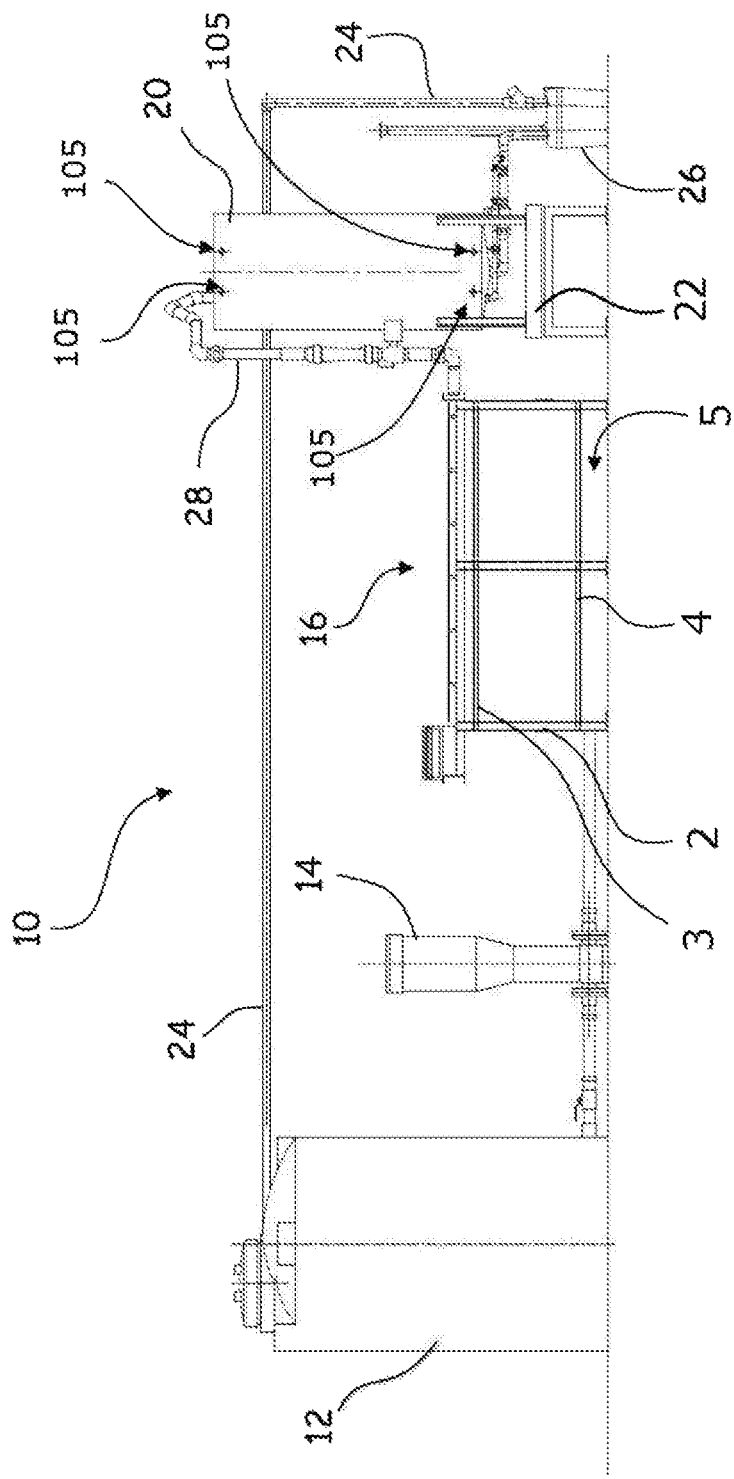
FIG. 2 is a side elevation view of the gravimetric test system depicted in FIG. 1.

Referring now to FIG. 1 and FIG. 2, a Gravimetric Test System (GTS) for testing the accuracy of fluid flow meters is presented. While the fluid could be any fluid, for the embodiments discussed herein the fluid is water. GTS (10) comprises a source tank (12) containing enough water to perform the desired test (say 200 gallons). Source tank (12) is in fluid communication with a supply pump (14) that is in fluid communication with, and supplies fluid to, test bench (16). For one embodiment, test bench (16) comprises a plurality of vertical support rails (2) mechanically associated with lower support rails (4) and upper support rails (3). Preferably, lower support rail (4) is associated a predefined distance from the end of the vertical support rails (2) to provide a toe space (5). Water from source tank (12) is pumped to and through water meters under test (MUT) (18) and through output path (28) to a measurement tank (20), which rests on scale(s) (22). The scale(s) (22) are used to measure the weight of the water pumped during the test and such weight is converted to a reference-volume. Finally, as noted below, this reference-volume is compared to that of the volumes registered on the various MUT (18).

After the reference-volume has been measured and the test is complete, the fluid in measurement tanks (20) is drained via return lines (24) and returned to the source tank using return pump (26).

As can be seen in FIG. 1, a plurality of meters (18) are connected in series allowing a plurality of meters to be tested simultaneously. The input and output of each meter is associated with an adapter apparatus (34) which is further associated with a bench-to-apparatus interface (30) associated with a test bench flow path. Notably, the inputs and outputs of MUT (18) could be connected with test bench (16) using typical prior art metering couplings; however, such requires much more work and time comparted to using a specially made adapter apparatus for coupling a fluid meter to the fluid flow path of a test system according to aspects of the current invention.

Referring now to FIG. 3 through FIG. 12, an adapter apparatus (34) for coupling a fluid meter (18) to the fluid flow path of a test system is presented.

Figure 4:
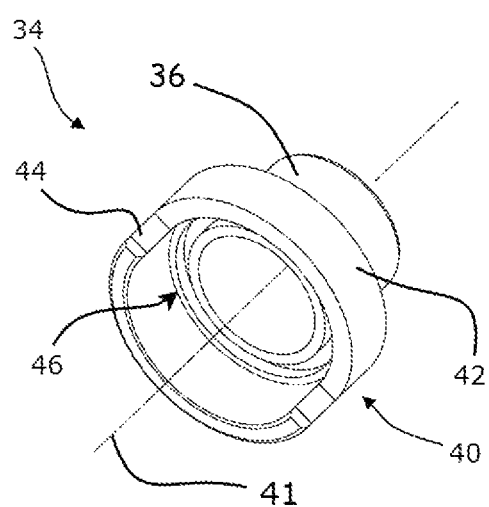
FIG. 4 is a close up elevated perspective view of an adapter apparatus.
Figure 5:
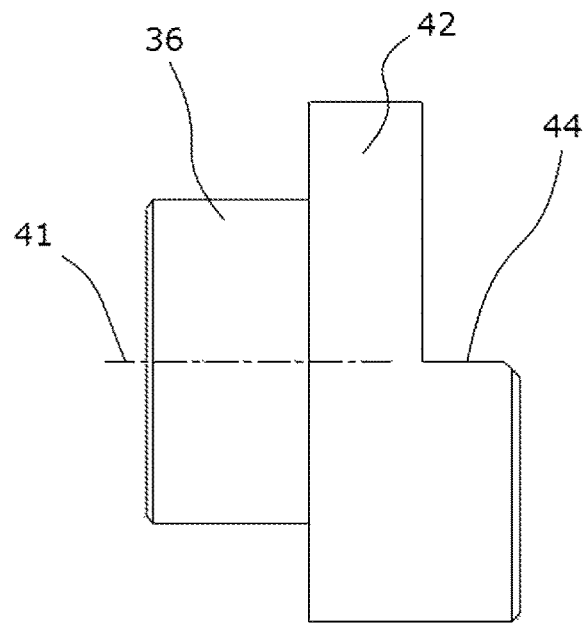
FIG. 5 is a right side elevation view of an adapter apparatus.
Figure 6:
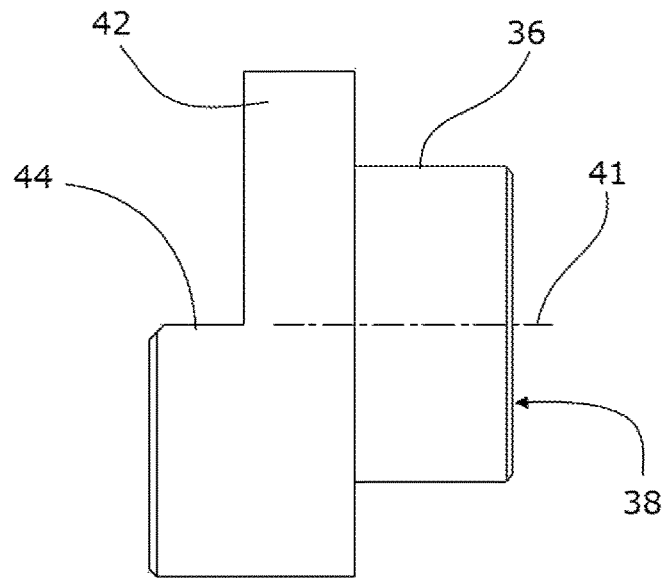
FIG. 6 is a left side elevation view of an adapter apparatus.
Figure 7:
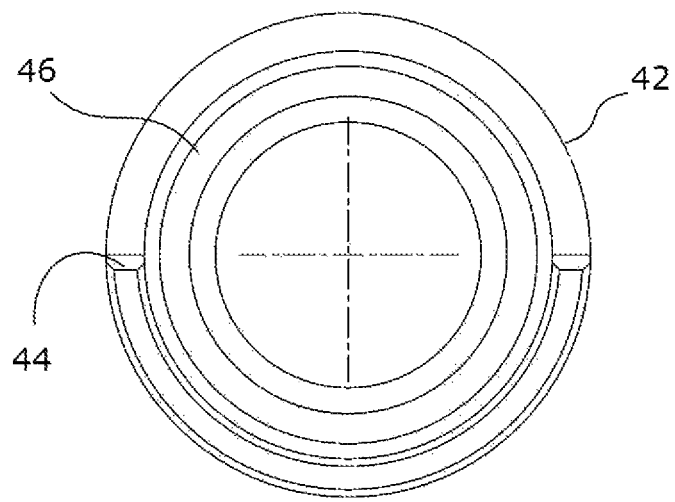
FIG. 7 is a front elevation view of an adapter apparatus.
Figure 8:
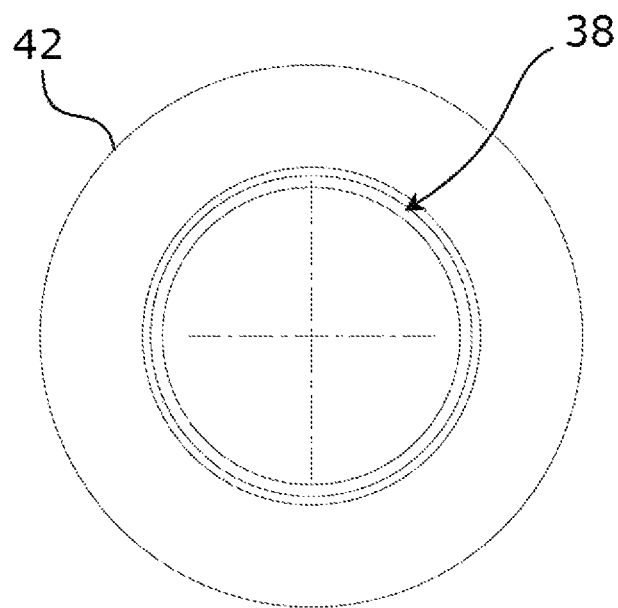
FIG. 8 is a back elevation view of an adapter apparatus.
Figure 9:
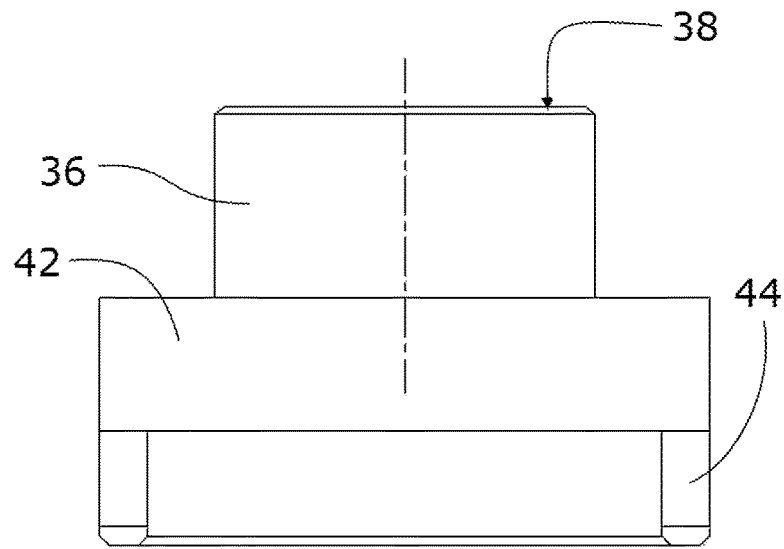
FIG. 9 is a top plan view of an adapter apparatus.
Figure 10:
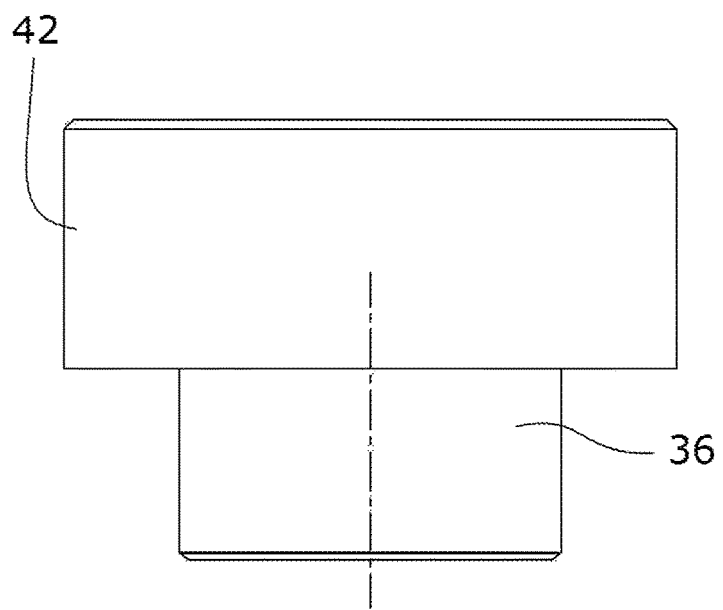
FIG. 10 is a bottom plan view of an adapter apparatus.

As best seen in FIG. 4, the apparatus (34) comprises a hollow body (36) defining an apparatus-to-bench interface (38, FIG. 8) at a first end and an apparatus-to-meter interface (40) at an opposing second end. The apparatus-to-bench interface (38) is configured for being associated with a bench-to-apparatus interface (30) defined by a test bench. For the currently preferred embodiment, apparatus-to-bench interface (38) defines a flat surface extending annularly around the end of said first end. Alternatively, such interface could employ a grove and O-ring configuration. The body (36) further defines a body-flow-path (41) there through thereby defining an apparatus-to-bench interface (38) outer perimeter and an apparatus-to-bench interface (38) inner perimeter. For example, when said body (36) defines a hollow cylinder, the apparatus-to-bench interface (38) outer perimeter defines the outer circumference of body (36) and the apparatus-to-bench interface (38) inner perimeter defines the inner circumference of body (36).

Figure 3A:
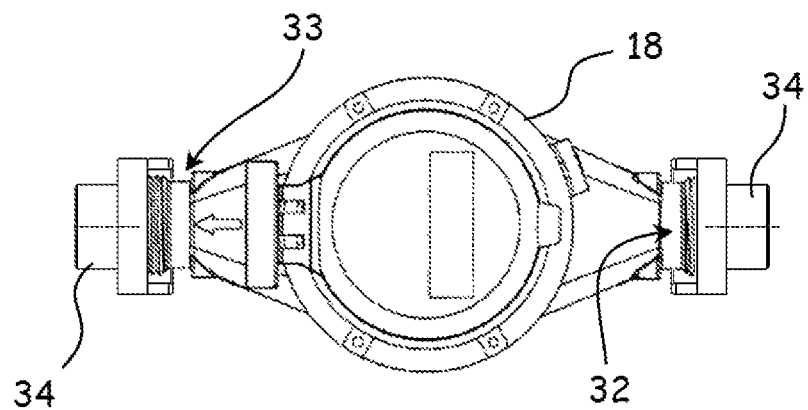
FIG. 3a is a top plan view of a prior art fluid meter with the meter attachment elements associated with an adapter apparatus.
Figure 3B:
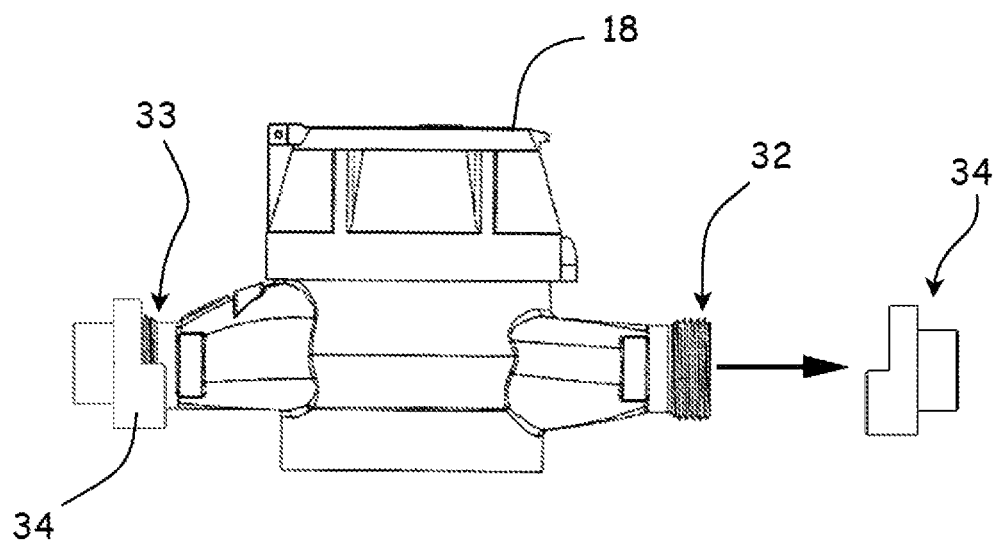

The apparatus-to-meter interface (40) defines a receiver-body (42) defining an receiver-inner perimeter and an receiver-outer perimeter wherein said receiver-inner perimeter is suitably sized to receive a meter attachment element (32, FIG. 3b). For one alternative embodiment, apparatus-to-meter interface (40) further defines a saddle portion (44) extending away from said receiver-body (42) and configured to hold/support said meter attachment element (32). It should be appreciated that when the meters under test (18) are first associated with a GTS (10), they are set loosely in opposing saddle portions (44) and then clamped into position as depicted in FIG. 3a. Restated, when all meters are in place as shown in FIG. 1, the GTS (10) hydraulically clamps the meters in place. Thus, saddle portion (44) is configured to provide a support function before the meter is clamped into place. Additionally, saddle portion (44) is further configured to align the center point of said meter attachment element (32) with the center point of said body-flow-path (41) thereby providing an alignment function.

Figure 3C:
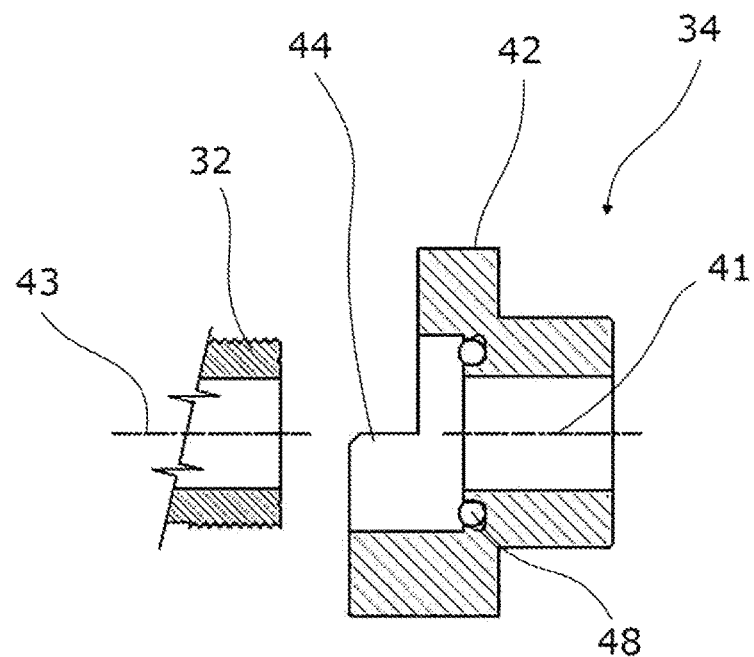
FIG. 3c is a side cross section view of an exemplary embodiment of an adapter apparatus showing a seal grove and seal enhancer.
Figure 3D:
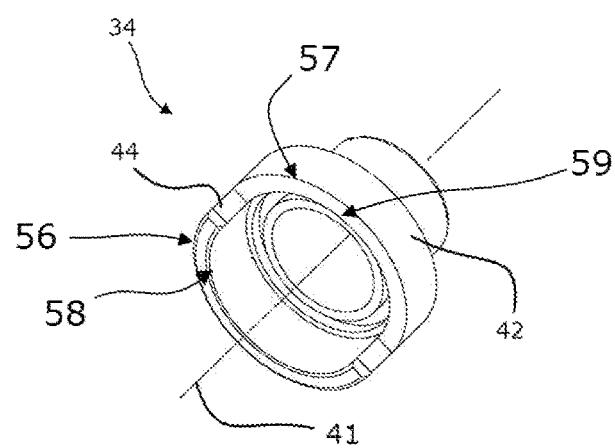
FIG. 3d is an elevated perspective view of an adapter apparatus.

As best seen in FIG. 3d and FIG. 4, for the currently preferred embodiment, the outer perimeter (56) of said saddle portion is half the length of said receiver-outer perimeter (57) and the inner perimeter (58) of said saddle portion is half the length of said receiver-inner perimeter (59) there by creating a half circle saddle perimeter for embodiments where the perimeter of said receiver-body (42) defines a circle.

The apparatus-to-meter interface further defines a seal grove (46) [see FIG. 3c, FIG. 4, FIG. 11, FIG. 12] recessed inside said receiver-body (42) and configured to receive a seal enhancer (48) and wherein said seal grove (46) extends annularly around said body-flow-path at said second end.

Figure 11:
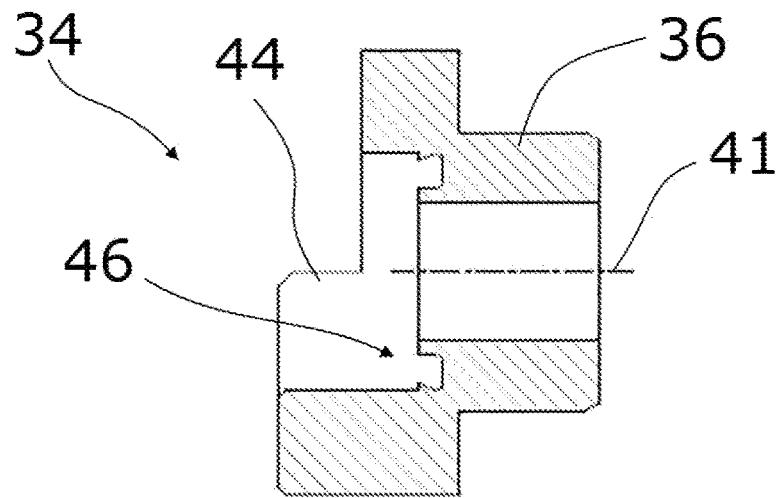
FIG. 11 is a side cross section view of an exemplary embodiment of an adapter apparatus showing a seal grove and no seal enhancer.
Figure 12:
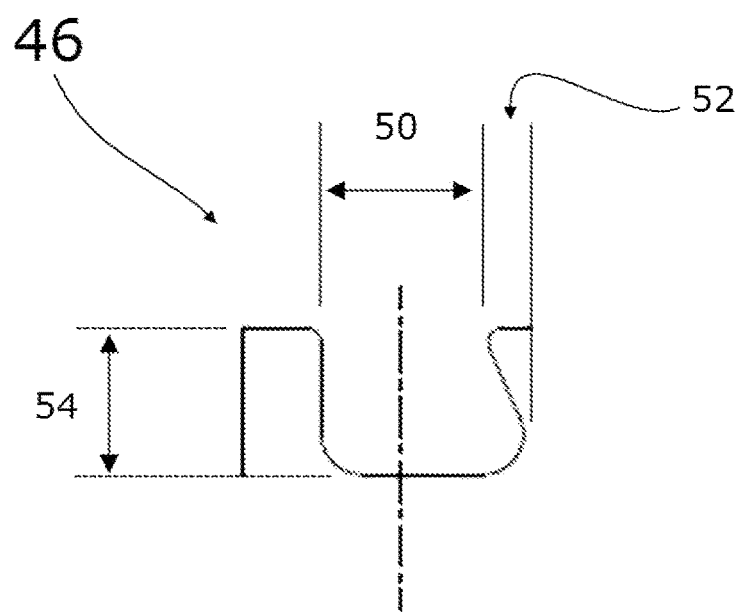
FIG. 12 is a cross sectional view of a seal grove.

As Depicted in FIG. 3c, for the currently preferred embodiment, seal enhancer (48) is an O-Ring suitably configured for associating with said seal grove. It will be appreciated that where the perimeter of seal grove (46) defines non circular geometric figures (squares, octagons, etc.), the outer perimeter of seal enhancer (48) preferably defines a similar geometric figure. As best seen in FIG. 3c, FIG. 11, and FIG. 12, for one embodiment, seal grove (46) defines a half-dovetail grove and seal enhancer (48) is an O-ring. For the currently preferred embodiment, grove outer width (50) for seal grove (46) is about 0.124 inches with the dovetail protrusion (52) being about 0.013 inches and the grove depth (54) being about 0.113 inches.

Notably, the various Adapter apparatus (34) component sizes may vary depending on the size of meter to be associated with a test bench (16). For one embodiment, receiver-body (42) is configured for being associated with a three-quarter inch meter attachment element (32). For such embodiment, the inner diameter of said hollow body (36) is about 0.875 inches and the inner diameter of said receiver body (42) is about 1.3 inches.

For a five-eighths meter, the receiver-body (42) defines an inner diameter of about 1.0 inch and the inner diameter of hollow body (36) is about 0.625 inches. Similarly, for one inch meters, the receiver-body (42) defines an inner diameter of about 1.8 inches and the inner diameter of said hollow body (36) is about 1.1 inches.

As noted before the meter under test (18) can be of just about any size and the adapter size is modified accordingly. Notably, for the range of meter sizes from three-fourths inch, five-eighths inch, and one inch, for one embodiment of the design, the adapter apparatus (34) is configured so that the dovetail grove (46) cross-section parameters do not change in size, only the major outside diameter size and minor inside diameter changes. Same is true for the seal enhancer (48). For a three-fourth inch meter, the O-Ring has the following dimensions: 1" inside diameter, 1.25" outside diameter and a width of ⅛" where the inside diameter tolerance is 0.984±0.010, and the width tolerance is 0.139±0.004. For five-eighths meters, three-fourths inch ID, 1" OD and a width of ⅛" where the ID tolerance is 0.734±0.010, and the width tolerance is 0.139±0.004. For the 1 inch meters, 1⁵⁄₁₆" ID, 1⁹⁄₁₆" OD and a width of ⅛" where the ID tolerance is 1.296±0.012, and the width tolerance is 0.139±0.004.

One of ordinary skill in the art will appreciate that the seal grove and seal enhancer configuration allows much lower clamping pressures compared to prior art systems. Such lower clamping pressures are particularly advantageous when testing the newer composite chase meters as such lower clamping pressures will not significantly deform the measurement chambers of such meters.

Large Meter Stabilizer Adapter

Referring now to FIG. 15-FIG. 20, one exemplary embodiment of a meter stabilizer apparatus (MSA) (70) for coupling a fluid meter to the fluid flow path of a test system is presented. For the preferred embodiment MSA (70) comprises a U-shaped support frame (72) comprising two vertically extending support members (74) mechanically associated by a horizontal member (76). Optional angular support members (73) may be used to mechanically associate the vertically extending support members (74) to the horizontal member (76). Notably, for yet another alternative embodiment, there is no horizontal support member (76) and the angular support members (73) simply connect at their upper end points. Preferably each vertically extending support member (74) either defines an integral latching device (78) or is mechanically associated with a latching device (78) at its lower end (75). Each vertically extending support member (74) further defines a vertical-member-interface (82).

As depicted in the various figures, each latching device (78) is configured to receive at least one locking member (80). Suitable embodiments of a locking member include pins and bolts and nuts.

Figure 15:
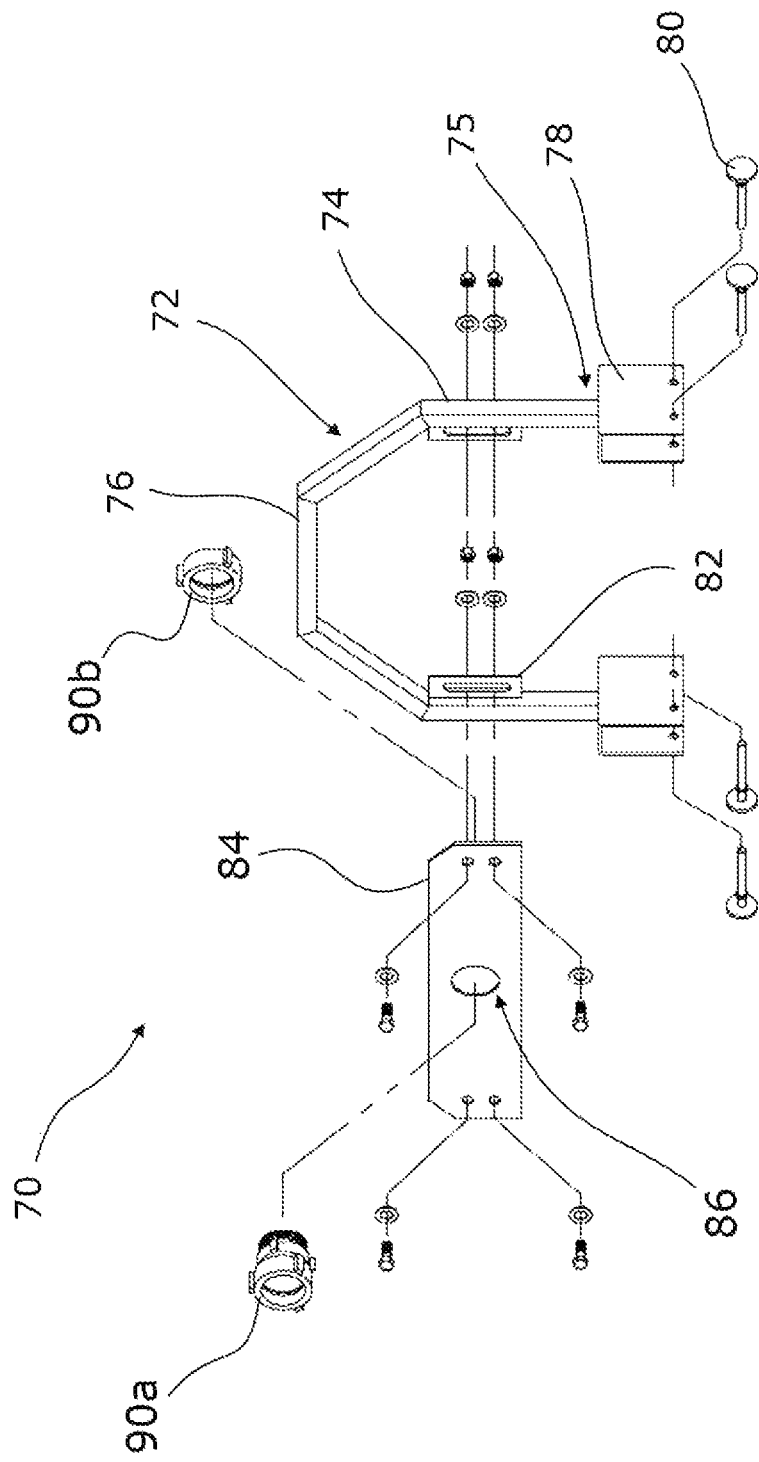
FIG. 15 is a front perspective exploded view of a meter stabilizer apparatus.
Figure 16:
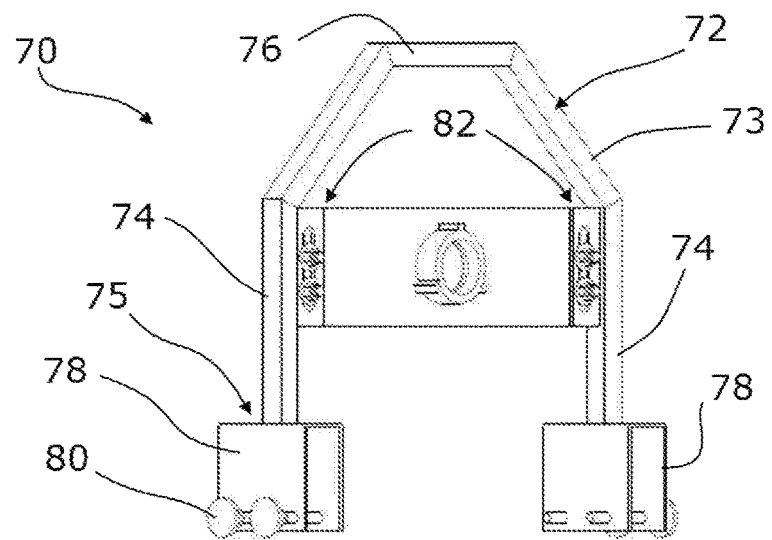
FIG. 16 is a back perspective view of a meter stabilizer apparatus.
Figure 15B:
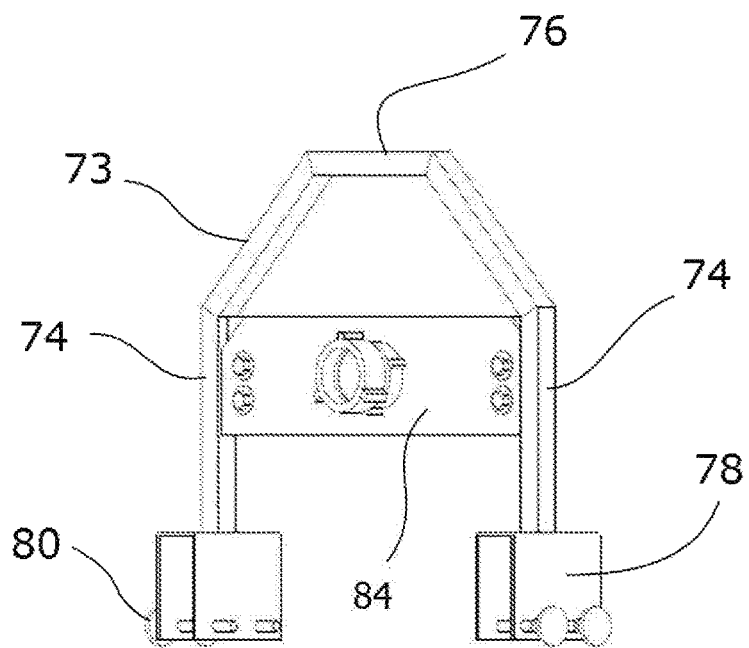
FIG. 15b is a front perspective view of a meter stabilizer apparatus.
Figure 17:
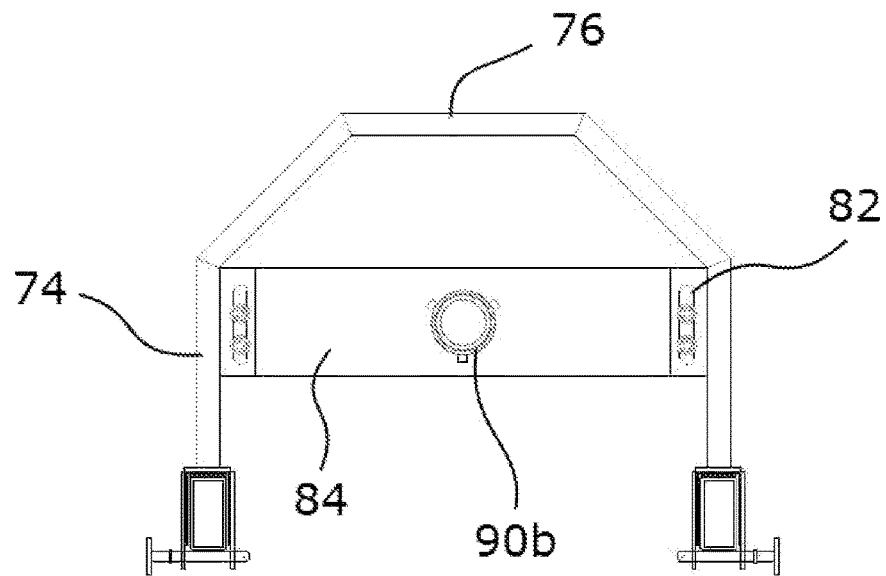
FIG. 17 is a front elevation view of a meter stabilizer apparatus.
Figure 18:
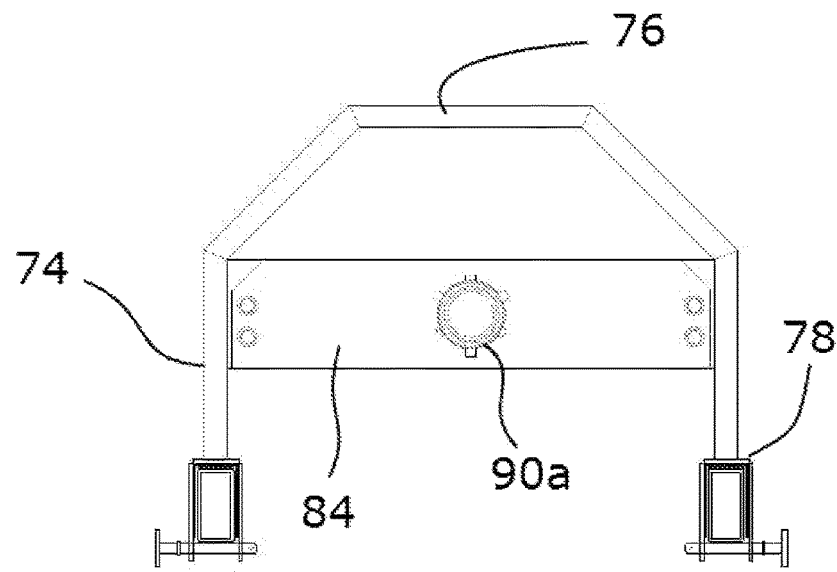
FIG. 18 is a back elevation view of a meter stabilizer apparatus.
Figure 19:
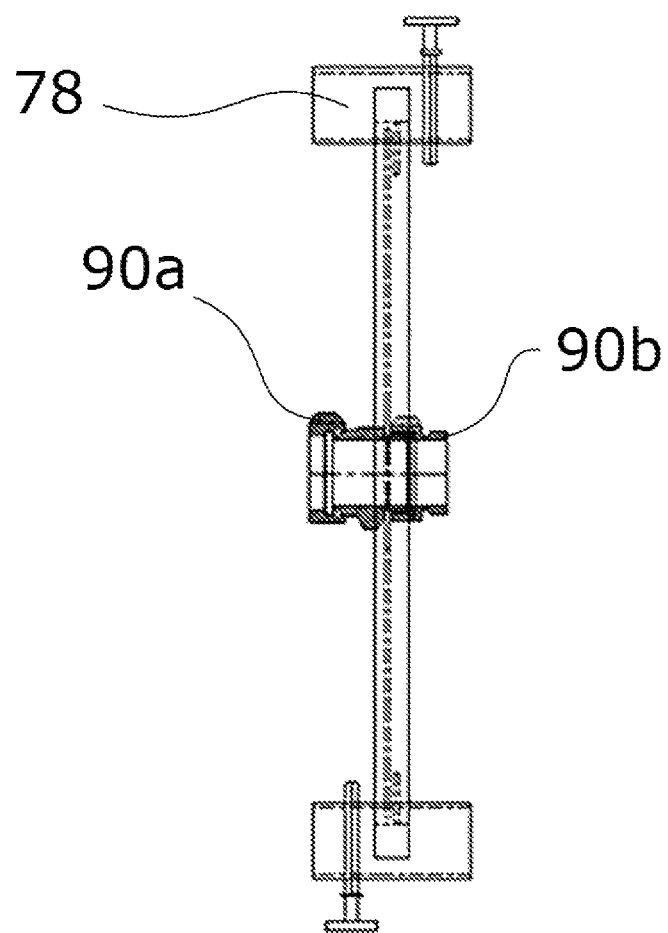
FIG. 19 is a top plan view of a meter stabilizer apparatus.
Figure 20:
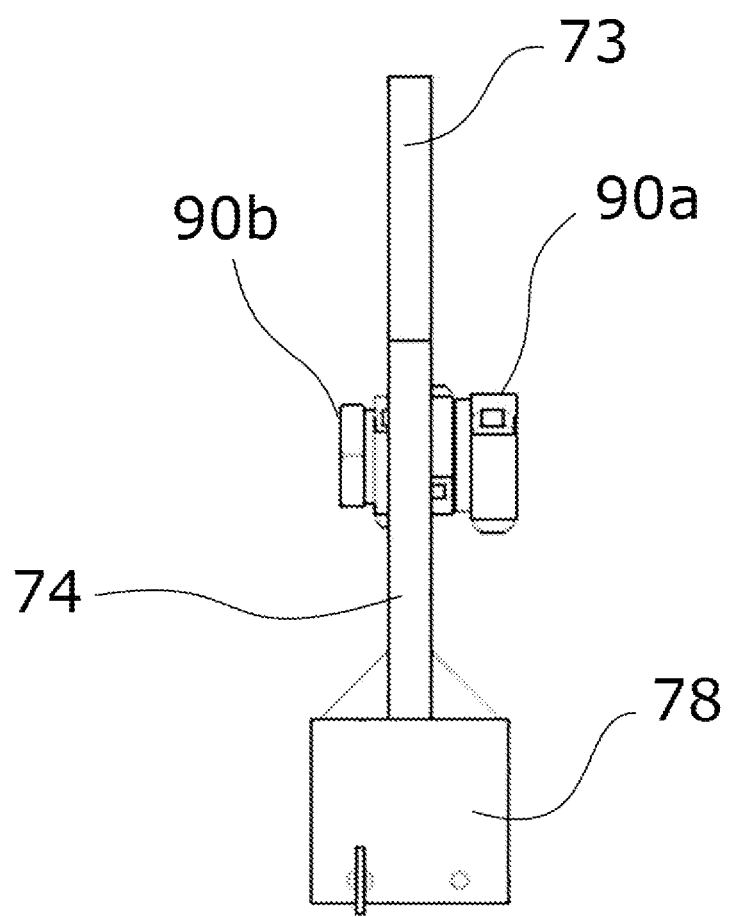
FIG. 20 is a side elevation view of a meter stabilizer apparatus.

As depicted in FIG. 15, FIG. 15a and FIG. 16, MSA (70) further comprising a horizontal adapter plate (84) configured for being mechanically associated with said vertical-member-interface (82). The horizontal adapter plate (84) further defines a coupling interface (86) that extends through the horizontal adapter plate. As depicted in FIG. 15, for one exemplary embodiment, the coupling interface defines a hole.

MSA (70) further comprises a coupling adapter (90) defining a first coupling end (90a) and an opposing second coupling end (90b) and wherein said coupling adapter (90) is mechanically associated with and extends through said coupling interface (86) so that said first coupling end (90a) is on one side of said horizontal adapter plate (84) and said second coupling end (90b) is on the opposing side of said horizontal adapter plate (84). The first coupling adapter end (90a) and the second coupling adapter end (90b) are configured for being associated with a meter attachment element of a fluid meter and/or a test bench flow path attachment point. One of ordinary skill in the art will appreciate that such a configuration allows a plurality of meters to be connected in series and tested at the same time. For example, if one wished to test 5 meters, one would use four MSA (70) device to align, support and stabilize the meters with the test bench.

Suitable coupling adapters (90) include swivel adapters that attach securely to the horizontal adapter plate but include a swivel end that can be mechanically associated with the meter attachment member of a fluid meter.

Latching devices (78) are configured for mechanically and moveably associating said U-shaped support frame with at fluid meter test bench support rail. The latching device are configured to slide along such support rails to a desired point. The locking members (80) are configured to lock the mechanical association between said U-shaped support frame and said test bench so that the MSA (70) device cannot tip over. It should be appreciated that for come configuration locking members (80) will lock the MSA (70) device in place. For one embodiment, the locking members (80) simply keep the MSA (70) device from falling over and allows the MSA (70) device to slide along the test bench support rails.

As best seen in FIG. 15, each vertical-member-interface (82) defines an adjustment function to allow the mechanical association between said vertical-member-interface (82) and said horizontal adapter plate (86) to be adjusted. For the embodiment in FIG. 15, such is accomplished by using vertical slots.

Dual Measurement Tank

Referring now to FIG. 1, FIG. 2, FIG. 13 and FIG. 14, a dual measurement tank (100) for storing a fluid used during a fluid flow testing procedure is presented.

For the currently preferred embodiment, dual measurement tank (100) comprises a first tank (102) defining a hollow cylinder comprising a first tank upper end (104) and a first tank lower end (106). The first tank upper end (104) is open (like the upper end of a cup) and the first tank lower end (106) defines a first tank bottom (108). The first tank defines a first tank height and a first tank diameter thereby defining a first tank volume.

Dual measurement tank (100) further comprises a second tank (110) defining a hollow cylinder comprising a second tank upper end (112) and a second tank lower end (114). The second tank upper end (112) is open and the second tank lower end (114) defines a second tank bottom (116). The second tank defines a second tank height and a second tank diameter thereby defining a second tank volume.

The first tank bottom (108) defines a first tank drain port (109) that extends through the approximate center of such first tank bottom (108). Such drain port is configured to drain the fluid out of said first tank once the testing and measurements are complete. Similarly, the second tank bottom (116) defines a second tank drain port (118) at the approximate center of such second tank bottom (116). The second tank drain port (118) is configured to drain the fluid out of such second tank once the testing and measurements are complete.

The first tank bottom further defines a drain port interface (107) configured for being associated with said second tank drain port (118). One embodiment of such an interface is a hole configured to be mechanically associated with the second tank drain port using means such as welding to define a leak proof seal. Notably, the distance from the side of the first tank (102) and the drain port interface (107) is greater than the diameter of the second tank (110) to provide for a predefined second tank offset (111). Such tank offset allows water to more fully drain after testing.

Figure 13:
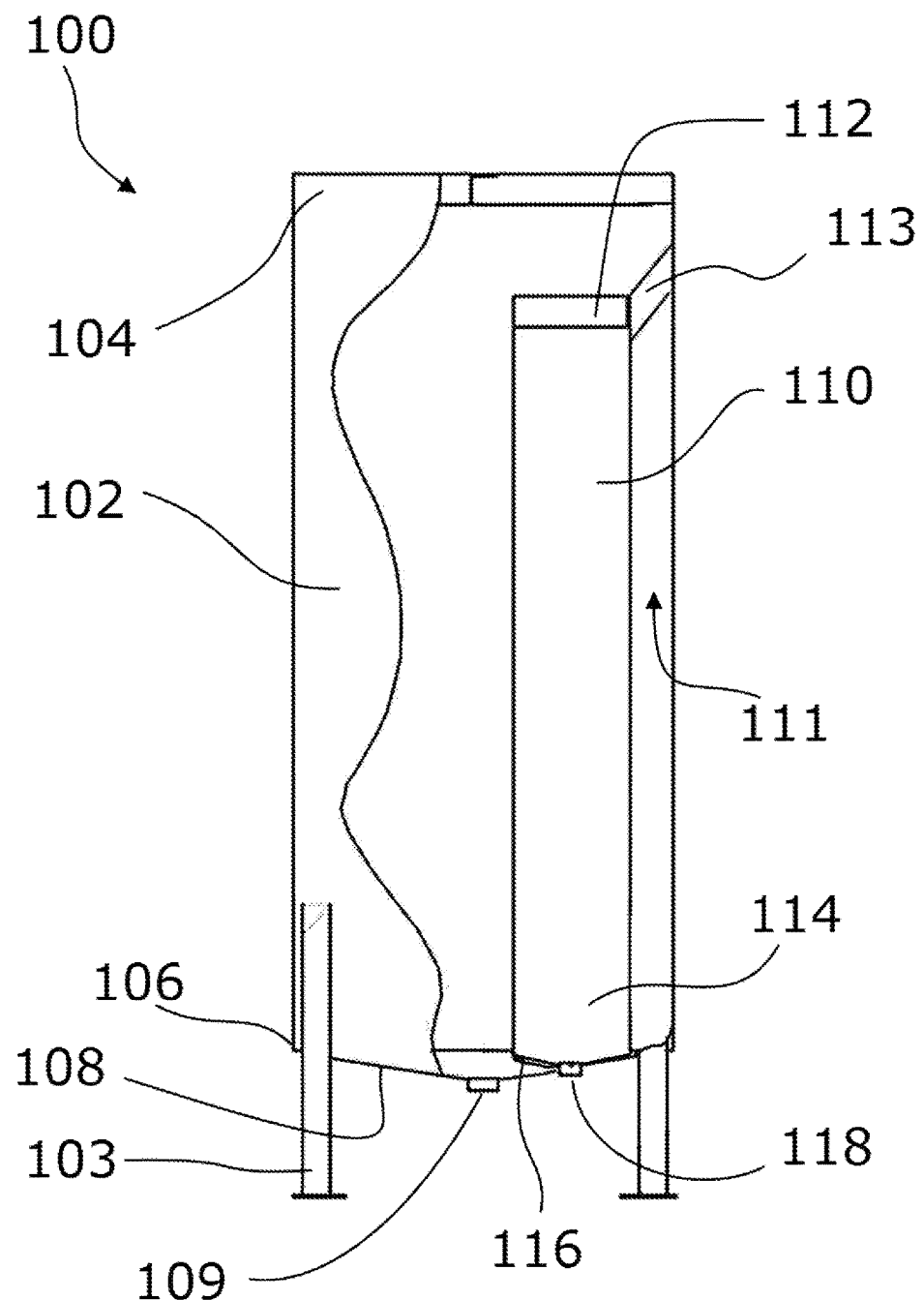
FIG. 13 is a side elevation view of a dual measurement tank.
Figure 14:
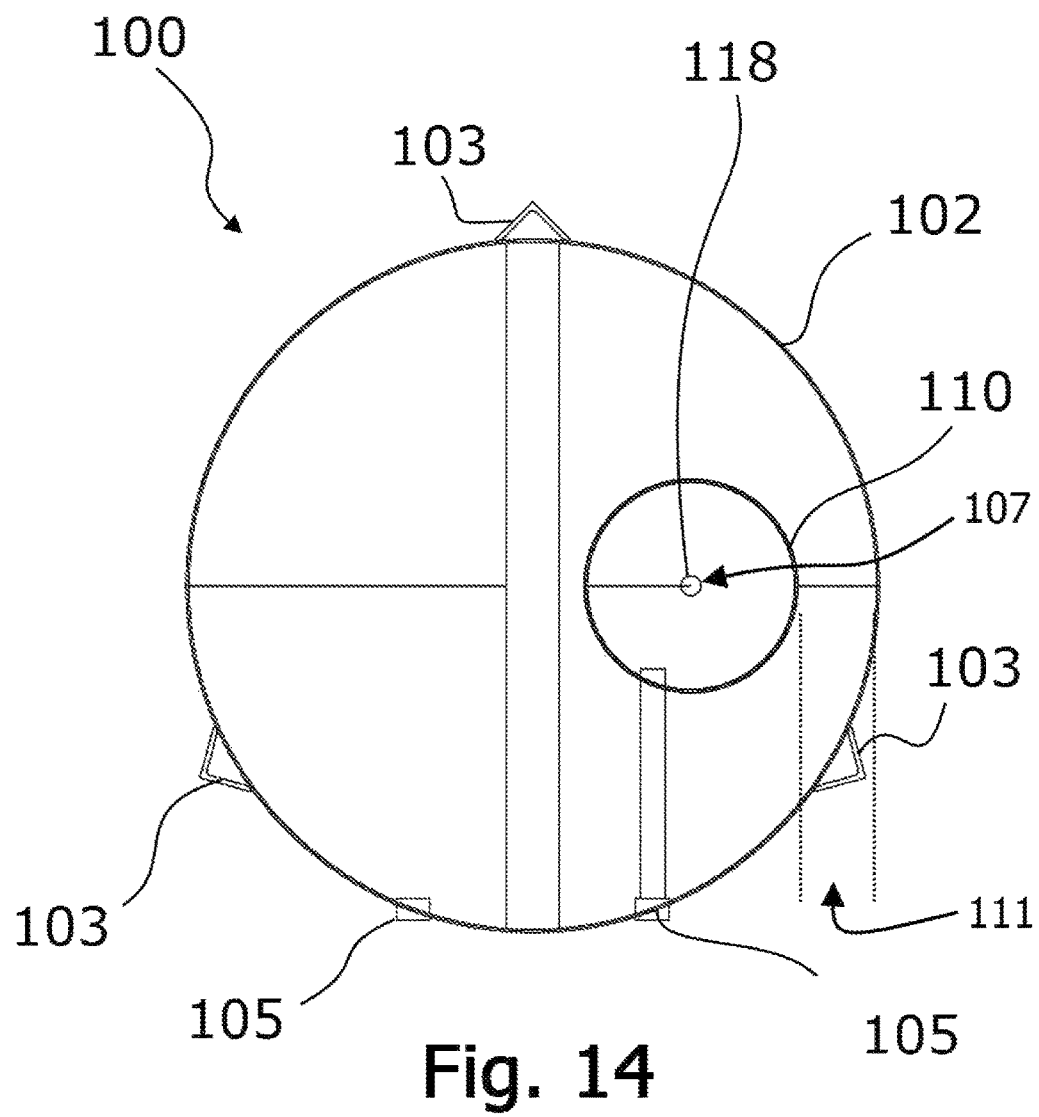
FIG. 14 is a top plan view of a dual measurement tank.

As depicted in FIG. 13, the second tank (110) is disposed inside said first tank (102) so that the drain port interface (107) is in fluid communication with the second tank drain port (118). Preferably such association is water tight. An upper support arm (113) is configured to mechanically associate an upper section of the second tank (112) to said first tank (102) to help stabilize the second tank.

For one embodiment, both tanks further define volume indicator ports (105) configured for being associated with volume indicators. Such volume indicators are typically graduated clear tubes that indicated the amount of water in the associated container.

Support members (103) are mechanically associated with the outside of the first tank and are configured to support the measurement tank (100) on a scale configured to measure the weight of the fluid inside the measurement tank (100).

To enhance draining, the first tank bottom (108) and the second tank bottom (116) define a convex surface extending away from the tanks and the drain ports are defined at the center of said convex surface. Such a configuration enhances draining of all the fluid from the measurement tank (100) after testing and measurements are complete.

Exemplary dual measurement tank volumes include a first tank volume of 100 gallons and said second tank volume of 10 gallons. As depicted in FIG. 1, the test bench output flow path (28) is configured to dump the water that flows through the meters under test (18) into second tank (110). If a 10-gallon slow flow test is being performed, the fluid only dumps into the second tank. If a 110-gallon test is being performed, the fluid is again dumped into the second tank until it becomes full and then the fluid overflows the second tank and into the first tank and starts to fill the first tank. At the end of the testing both tanks contain water and the weight of such water is measured by a scale to determine the volume of water in measurement tank (100) which is called the reference volume (for this document). The volume of fluid flow through each meter under test (18) is recorded by each individual meter and such values are compared to the reference-volume. The amount of variation is call the meter error.

One of ordinary skill in the art will appreciate that prior art systems used a plurality of individual tanks with each tank having its own scale. (for example: a 100-gallon tank and associate scale and a 10-gallon tank and associated scale). Such a configuration not only consumes considerably more space than the dual tank system, such a configuration is significantly more expensive.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A dual measurement tank for storing a fluid used during a fluid flow testing procedure, said dual measurement tank comprising:
    a first tank defining a hollow cylinder comprising a first tank upper end and a first tank lower end wherein said first tank upper end is open and said first tank lower end defines a first tank bottom and wherein said first tank further defines a first tank volume;
    a second tank disposed inside said first tank, said second tank defining a hollow cylinder comprising a second tank upper end and a second tank lower end wherein said second tank upper end is open and said second tank lower end defines a second tank bottom and wherein said second tank defines a second tank volume that is less than said first tank volume;
    wherein said first tank bottom defines a first tank drain port at the approximate center of said first tank bottom and wherein said first tank drain port is configured to drain the fluid out of said first tank;
    wherein said second tank bottom defines a second tank drain port at the approximate center of said second tank bottom wherein said second tank drain port is configured to drain the fluid out of said second tank;
    wherein said first tank bottom further defines a drain port interface configured for being associated with said second tank drain port and wherein said drain port interface is positioned between said first tank drain port and the side of said first tank to provide for a second tank offset defining a gap between the side of said second tank and the side of said first tank;
    wherein the second tank is disposed inside said first tank so that said drain port interface is in fluid communication with said second tank drain port; and
    support members mechanically associated with said first tank wherein said support members are suitably configured to support the dual measurement tank on a scale.

2. A dual measurement tank as in claim 1, wherein said first tank bottom defines a convex surface extending away from said first tank and wherein said first tank drain port is defined at the center of said convex surface.

3. A dual measurement tank as in claim 2, wherein said second tank bottom defines a convex surface extending away from said second tank wherein said second tank drain port is defined at the center of said convex surface.

4. A dual measurement tank as in claim 3, further comprising an upper support arm configured to mechanically associate an upper section of said second tank to said first tank.

5. A dual measurement tank as in claim 4, wherein said first tank volume is 100 gallons and said second tank volume is 10 gallons.

6. A dual measurement tank for storing a fluid used during a fluid flow testing procedure, said dual measurement tank comprising:

a first tank defining a hollow cylinder comprising a first tank upper end and a first tank lower end wherein said first tank upper end is open and said first tank lower end defines a first tank bottom and wherein said first tank further defines a first tank volume;

a second tank disposed inside said first tank, said second tank defining a hollow cylinder comprising a second tank upper end and a second tank lower end wherein said second tank upper end does not extend beyond said first tank upper end and wherein said second tank upper end is open and said second tank lower end defines a second tank bottom and wherein said second tank defines a second tank volume that is less than said first tank volume;

wherein said first tank bottom defines a first tank drain port at the center of said first tank bottom and wherein said first tank drain port is configured to drain the fluid out of said first tank;

wherein said second tank bottom defines a second tank drain port at the center of said second tank bottom wherein said second tank drain port is configured to drain the fluid out of said second tank;

wherein the second tank is disposed inside said first tank so that said drain port interface is in fluid communication and in vertical alignment with said second tank drain port;

wherein said drain port interface is disposed between the first tank drain port and the vertical side of said first tank so that a gap is defined between the vertical sides of said first tank and said second tank; and support members mechanically associated with said first tank wherein said support members are suitably configured to support the dual measurement tank on a scale.

7. A dual measurement tank as in claim 6, wherein said first tank bottom defines a convex surface extending away from said first tank and wherein said first tank drain port is defined at the center of said convex surface.

8. A dual measurement tank as in claim 7, wherein said second tank bottom defines a convex surface extending away from said second tank wherein said second tank drain port is defined at the center of said convex surface.

9. A dual measurement tank as in claim 8, further comprising an upper support arm configured to mechanically associate an upper section of said second tank to said first tank.

10. A dual measurement tank as in claim 6, wherein said first tank volume is 100 gallons and said second tank volume is 10 gallons.

11. A dual measurement tank as in claim 6, wherein said first tank further defines a volume indicator port.

12. A multi-chambered fluid storage container for use with a fluid meter testing system, said multi-chambered fluid storage container comprising:

a main storage chamber defining a first volume, said main storage chamber comprising at least one main chamber peripheral side defining the perimeter of said main chamber and connecting a main chamber open end to an opposing main chamber lower closed end thereby defining said first volume;

a secondary storage chamber defining a second volume that is smaller than said first volume wherein said secondary storage chamber is disposed inside said main storage chamber and wherein said secondary storage chamber comprises at least one secondary chamber peripheral side defining the perimeter of said secondary storage chamber and connecting a secondary storage chamber open end to an opposing secondary storage chamber closed lower end thereby defining said second volume;

a main storage chamber drain port defined by said main chamber lower closed end wherein said main storage chamber drain port is configured to drain the fluid out of said main storage chamber;

a main storage chamber drain port interface configured for being mechanically associated with the drain port of a secondary storage chamber and wherein the distance from the nearest at least one main chamber peripheral side to said drain port interface defines the interface-distance;

a secondary storage chamber drain port defined by said secondary storage chamber lower closed end wherein said secondary storage chamber drain port is disposed at the approximate center of said secondary storage chamber lower closed end and wherein the secondary storage chamber is disposed inside said main storage chamber so that said drain port interface is in fluid communication and in vertical alignment with said secondary chamber drain port;

wherein the interface-distance is predefined to provide for a gap between the said at least one main chamber peripheral side and said at least one secondary chamber peripheral side; and support members mechanically associated with said main storage chamber wherein said support members are suitably configured to support the main storage chamber on a scale.

13. A multi-chambered fluid storage container as in claim 12, wherein the perimeter of said main storage chamber defines a circle.

14. A multi-chambered fluid storage container as in claim 13, wherein said main storage chamber closed end defines a convex surface extending away from said main storage chamber and wherein said main storage chamber drain port is defined at the center of said convex surface.

15. A multi-chambered fluid storage container as in claim 12, wherein said secondary storage chamber closed end defines a convex surface extending away from said secondary storage chamber and wherein said secondary storage chamber drain port is defined at the center of said convex surface.

16. A multi-chambered fluid storage container as in claim 12, further comprising an upper support arm configured to mechanically associate an upper section of said secondary storage chamber to said main storage chamber.

17. A multi-chambered fluid storage container as in claim 12, wherein said first volume is 100 gallons and said second volume is 10 gallons.

18. A multi-chambered fluid storage container as in claim 17, wherein said main storage chamber further defines a volume indicator.

* * * * *